United States Patent [19]

Ochiai

[11] 4,008,781
[45] Feb. 22, 1977

[54] AUTOMATIC VEHICLE-SPEED ADJUSTING DEVICE

[76] Inventor: Tsurunosuke Ochiai, 3169, Kumanohara, Karatsu, Saga, Japan

[22] Filed: Oct. 28, 1975

[21] Appl. No.: 626,593

[52] U.S. Cl. .............................. 180/104; 180/105 R; 200/61.47
[51] Int. Cl.² ........................................ B60K 31/00
[58] Field of Search ............... 180/103 R, 104, 105, 180/108, 41; 200/61.47

[56] References Cited
UNITED STATES PATENTS

| | | | |
|---|---|---|---|
| 1,913,219 | 6/1933 | Sprague | 200/61.47 |
| 2,056,052 | 9/1936 | Mason | 200/61.47 |
| 2,236,790 | 4/1941 | Erich | 200/61.47 |
| 2,275,011 | 3/1942 | Erich | 200/61.47 |
| 3,398,991 | 8/1968 | Compton | 180/104 X |
| 3,683,136 | 8/1972 | van den Bosch | 200/61.47 |
| 3,778,763 | 12/1973 | Johns | 200/61.47 X |

Primary Examiner—Joseph F. Peters, Jr.
Assistant Examiner—Terrance L. Siemens
Attorney, Agent, or Firm—Frank J. Jordan

[57] ABSTRACT

A device for controlling the speed of a vehicle as the latter negotiates a curve includes a U-shaped tube. Terminal elements are secured in an air-tight manner in the legs of the U-shaped tube, and mercury is disposed in the U-shaped tube such as to normally contact the terminal elements when the vehicle is moving in a straight path. The mercury is movable in the U-shaped tube so as to break contact with one of the terminal elements when the vehicle negotiates a curve and subjects the mercury to centrifugal force.

6 Claims, 4 Drawing Figures

AUTOMATIC VEHICLE-SPEED ADJUSTING DEVICE

BACKGROUND OF THE INVENTION

This invention relates to a device for adjusting the speed of a vehicle as the latter negotiates a curve or the like.

Various improvements and developments have been made in automobiles which have resulted in great advancement of the automobile industry. Braking mechanisms or devices especially have advance particularly with the invention of power brakes which utilize hydraulic pressure. However, even power brakes still have to be manually operated by depressing a brake pedal or the like. Therefore when an automobile is operated at a speed which exceeds the allowable speed for a curve of a road where the braking operations may become very difficult, the car may hit an oncoming automobile, skid, turn side ways or otherwise be adversely affected in terms of control by the driver.

Accordingly, it is an object of the present invention to provide a device which automatically adjusts the speed of an automobile on the curve of a road by making use of the centrifugal force which acts on the automobile when the latter negotiates a curve.

Another object of this invention is to provide a device for adjusting the speed of an automobile which is simple in construction and which can be easily connected to the ignition circuit of an automobile.

The above and further objects and novel features of the invention will be more fully apparent from the following detailed description when the same is read in connection with the accompanying drawings. It is to be expressly understood, however, that the drawings are for the purpose of illustration only and are not intended to define the limits of the invention.

SUMMARY OF THE INVENTION

A device for controlling the speed of a vehicle as the latter negotiates a curve includes a U-shaped tube having two legs joined to a cross over. The U-shaped tube is disposed in the vehicle with its two legs substantially vertically disposed and with the general plane of the U-shaped tube disposed generally transversely of the longitudinal axis of the vehicle. Terminal elements are secured in an air-tight manner in the legs of the U-shaped tube, and mercury is disposed in the U-shaped tube such so as to normally contact the terminal elements when the vehicle is moving in a straight path. The mercury is movable in the U-shaped tube so as to break contact with one of the terminal elements when the vehicle negotiates a curve and subjects the mercury to centrifugal force.

DETAILED DESCRIPTION OF THE INVENTION

This invention relates to a device which automatically adjusts the speed of an automobile or other vehicle to a safe range in such a way that when the automobile makes a turn at a curve in a road, mercury which is contained in a U-shaped tube moves in either one of two directions due to the centrifugal force caused by the turning movement of the automobile. The movement of the mercury causes an interuption in the electrical connection between the battery and the spark plugs, thereby stopping the automobile engine and automatically reducing its speed.

Figure 1:
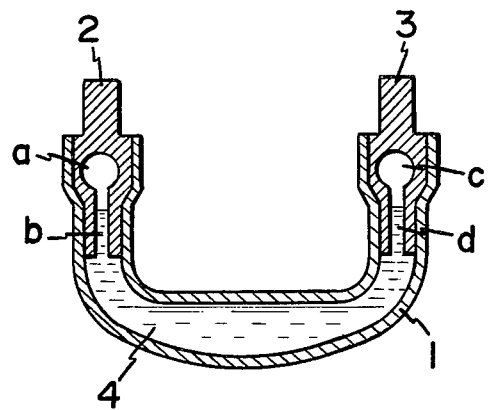
FIG. 1 is a front cross-sectional view of one embodiment of the present invention shown in an operational status where it is not subjected to centrifugal force.

Referring to the drawings, FIG. 1 shows one embodiment of the device in which numeral 1 indicates a U-shaped tube which is made of insulating material such as rubber or plastic. The U-shaped tube has a bottom horizontal portion having an inner diameter which is greater than the inner diameter of either of the side or upper end portions of the tube. A desired amount of liquid mercury 4 is disposed in the tube 1.

A terminal 2 is provided in the upper end of one leg of the tube 1. The terminal 2 has an air chamber $a$ and a channel $b$ through which the mercury 4 in the tube 1 is communicable with the air chamber $a$. The terminal 2 is inserted and fixed in an air-tight manner in one end of the U-shaped tube 1. Another terminal 3 which has an air chamber $c$ and a channel $d$ is inserted and secured in an air-tight manner in the other open end of the U-shaped tube 1 in the same manner as terminal 2. Terminal 2 is connected to a battery 5 and terminal 3 is connected to spark plugs 6.

The manner in which the device of this invention is operated is hereinafter described with reference to the attached drawings.

Figure 3:
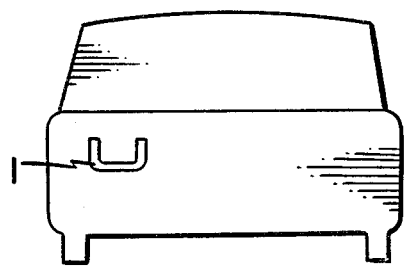
FIG. 3 is a schematic view showing the mounting location of the device in an automobile.
Figure 4:
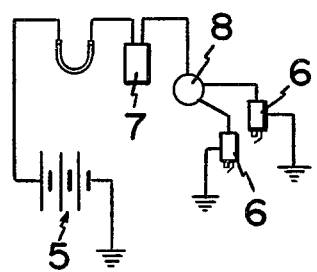
FIG. 4 is an illustrative ignition circuit wherein the device is located between the spark plugs and the battery.

As shown in FIG. 3 and FIG. 4, the device is installed in an automobile and is disposed vertically adjacent to the automobile engine at right angles to the direction of motion of the automobile in such a way that it is located in the electric circuit between the battery 5 and the spark plugs 6.

In FIG. 3, numeral 7 indicates an ignition coil while numeral 8 indicates a distributor. When the automobile is operated on a straight road, the mercury 4 in both legs of the U-shaped tube 1 at both ends of the tube is maintained at the same level since the mercury is not subjected to centrifugal force. Therefore, both ends of the mercury 4 are in contact with the respective terminals 2 and 3, and the engine of the car operates in the normal manner due to the completion of the ignition cirucit through the mercury 4 which contacts both terminals 2 and 3.

Figure 2:
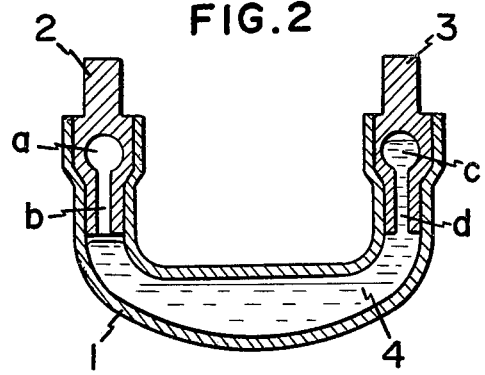
FIG. 2 is a front cross-sectional view of the device of the present invention similar to FIG. 1 but showing the operational status when the device is subjected to centrifugal force.

When the automobile is steered to the left, for example on a curve of a road, the centrifugal force acts on the device whereby the mercury 4 in the U-shaped tube 1 is forced to the right as shown in FIG. 2 wherein the mercury 4 in the left hand leg of the U-shaped tube 1 is separated from terminal 2 while the mercury 4 in the other leg of the U-shaped tube 1 passes into the air chamber $c$ of the terminal 3. Since contact between terminal 2 and the mercury 4 is broken, electric current is no longer supplied to the spark plugs 6 from the battery 5. Accordingly, ignition no longer occurs until the automobile is again on a straight road or a road of less curvature where the centrifugal force is not sufficient to move the mercury 4 to the extent necessary to break the contact with the terminal. In this manner, the device is able to automatically adjust the speed of an automobile as it is driven on a curve of a road.

It is noted that the diameter of channel $b$ or $d$ is considerably smaller than any other portion of the U-shaped tube 1 so that even when the mercury 4 of the central portion of the tube 1 moves toward either leg to a small degree, the mercury 4 is raised to a considerable degree in the channels $b$ or $d$ to the air chamber $a$ or $c$ while the other end is lowered by a corresponding degree and is separated from the terminal. The small horizontal movement of the mercury 4 is reflected as a long or larger vertical movement within the channels $b$ or $d$, thereby correctly and precisely braking and establishing contact within the ignition circuit between the terminals 2, 3 and the mercury 4.

Furthermore, since the diameter at the center of the U-shaped tube 1 is greater than at any other location rather than being uniform throughout the length of the tube 1, the mercury 4 is far less susceptible to the lateral tilting motion which occurs when the automobile is driven on a banked road.

Although modern automobiles are equipped with a spring suspension system that absorbs most of the road shock picked up from the wheels as well as most of the vibrations caused by the automobiles themselves, the mercury which is contained in the U-shaped tube 1 is subject to the above vibrations to a certain extent. However, since the vibration affects the mercury in an incontinuous way, it will be observed that the air chambers $a$, $c$ and the channels $b$, $d$ are designed following the principles of shock absorbers such that they suppress the movement of the mercury which is caused by vibrations. Accordingly, the influence of vibrations on the mercury is far smaller than that of centrifugal force which acts on the device when the automobile is driven on a curve of a road.

Accordingly, the device can automatically adjust the speed of an automobile when the automobile is driven on a curve of a road by making use of the centrifugal force caused by the turning movement of the automobile. The device is easily mounted on any type of automobile since it is simple in construction.

While there has been shown and described in considerable detail a preferred embodiment of the invention, it will be understood by those skilled in the art that the invention is not limited by such description, but may take various other forms within the scope of the following claims.

What is claimed is:

1. A device for controlling the speed of a vehicle as the latter negotiates a curve comprising a U-shaped tube having two legs joined to a cross over, said U-shaped tube being disposed in said vehicle with its two legs substantially vertically disposed and with the general plane of the U-shaped tube being disposed generally transversely of the longitudinal axis of the vehicle, terminal elements secured in an air-tight manner in the legs of said U-shaped tube, mercury disposed in said U-shaped tube such as to normally contact said terminal elements when the vehicle is moving in a straight path, said terminal elements have vertical internal passages with the lower ends of said internal passages leading to said mercury in said U-shaped tube, said terminal elements have upper closed ends, and enlarged air-chambers in said terminal elements leading from the upper ends of said internal passages, said mercury being movable in said U-shaped tube so as to break contact with one of said terminal elements when the vehicle negotiates a curve and subjects the mercury to centrifugal force.

2. A device according to claim 1 wherein the diameter of said internal passages in said terminal elements is less than the diameter of the legs and the cross over of said U-shaped tube.

3. A device according to claim 1 wherein said cross over of said U-shaped tube has a variable diameter with the largest diameter thereof being substantially at the center of said cross over.

4. A device according to claim 1 wherein said device is installed on a vehicle having an internal combustion engine having an ignition circuit which includes a battery and spark plugs, said device being installed in said ignition circuit between said battery and said spark plugs such that the ignition circuit is interupted when contact between said mercury and one of said terminal elements is broken.

5. A device according to claim 1 wherein said U-shaped tube is made of electrical insulating material and said terminals are made of electrical conducting material.

6. A device according to claim 1 wherein said enlarged air-chambers are in communication only with said internal passages of said terminal elements and thereby serve as air cushions for said mercury.

* * * * *